United States Patent Office 2,776,912
Patented Jan. 8, 1957

2,776,912

PROCESS OF COATING PAPER WITH A GELLABLE WATER - SOLUBLE CELLULOSE DERIVATIVE AND PIGMENT AND GELLING SAID COATING

George P. Gregory, Elsmere, Del., assignor to Hercules Powder Company, Wilmington, Del., a corporation of Delaware No Drawing. Application April 30, 1952,
Serial No. 285,325

10 Claims. (Cl. 117—62)

This invention relates to an improvement in coating paper with a coating composition or color to obtain a coated paper of the type having a base of cellulosic fibers and a printing surface consisting essentially of a film of contiguous pigment particles interspersed in binder by means of which the pigment is retained on the base.

The paper coating colors as employed in the paper industry today consist essentially of a water solution of a binder such as starch or casein to which is added fillers. The adhesive filler mixture is applied to paper in metered amounts and dried. The ratio of pigment to adhesive is regulated to provide sufficient bond between the coating and the paper base to prevent picking during the printing operation. The incorporation of the adhesive in the portions necessary to prevent picking results in certain disadvantages. For one thing, the optical properties of the coated sheet are adversely affected. Other disadvantages relate to factors affecting the lay of the ink and the ink drying rate, both of which properties are adversely affected by the high ratio of binder to pigment.

For some time it has been apparent that an adhesive which could be used in lesser amounts than casein or starch and still provide adequate strength against picking might conceivably result in improved optical properties and improved printing characteristics. Such a result has in fact been provided to a certain extent by the process of U. S. 2,502,783 to D. R. Erickson. This process comprises coating paper with a continuous viscous coating consisting of pigment dispersed in a solution of hydroxyethyl cellulose and aqueous sodium hydroxide, and immediately after application of the coating, precipitating the hydroxyethyl cellulose which then acts as an adhesive to bind the contiguous pigment particles to each other and to the base and finally drying the coated paper.

This process, while accomplishing the desired result of providing a relatively high pigment to binder ratio, has certain inherent disadvantages introduced by the relatively high alkali content of the coating colors. These are (1) the variation in surface pH of the coating due to a lack of uniformity in the neutralization of the alkali, thereby causing uneven printing properties; (2) degradation of the surface fibers of the base stock by the alkali with a resulting loss in brightness; and (3) the difficulty of handling and of disposing of waste color.

Now in accordance with the present invention there has been discovered a process for preparing a coated paper using a water-soluble cellulose derivative as a binder for the coating color, thereby obviating the alkali necessary in the process of Erickson. It has unexpectedly been found that the increased adhesive strength Erickson obtained by the use of a water-insoluble but alkali-soluble cellulose derivative which was precipitated by neutralization of the alkali may be obtained, in the case of a water-soluble cellulose derivative, by coagulating the cellulose derivative with a setting agent. The setting agents which are used to coagulate the cellulose derivative are electrolytes whose constituent ions have a strong affinity for water molecules. These setting agents are described in detail infra.

In carrying out the invention a dispersion of a coating pigment in an aqueous solution of a gellable, water-soluble cellulose derivative is prepared. This coating color is applied to a fibrous cellulosic web by any suitable coating device. The coated surface is then contacted with a setting agent which coagulates the adhesive in the coating to form a film of contiguous pigment particles bound together by the cellulose derivative. The excess setting agent is squeezed out and the coated sheet is then dried by any of the means known to the art.

Another variation of this process, called the "reverse coating process," comprises impregnating the cellulosic web with an aqueous solution of setting agent for the cellulose derivative, preferably drying the impregnated paper, although this step is not absolutely necessary, covering a face of the paper with a continuous coating of pigment dispersed in an aqueous solution of a cellulose derivative, and finally drying the coated paper. Thus, by means of the reverse coating process the steps of dipping the coated paper in the setting agent followed by squeezing the coated sheet are eliminated. This simplified process enables the manufacturer to make use of existing coating machines, which are not designed for the dipping and squeezing steps, without modification.

Whichever process is used, there results a coated paper of the type having a base of cellulosic fibers and a printing surface consisting essentially of a film of contiguous pigment particles interspersed in binder by means of which the pigment is retained on the base.

The coated papers prepared according to this invention have coatings which are much stronger and more resistant to picking than those coatings prepared without the use of a setting agent. At equal concentrations of adhesive, the coated papers prepared according to this invention have pick resistance values from 2 to 5 times greater than those observed in coatings prepared using the prior art casein as the adhesive. Moreover, coatings using the water-soluble cellulose derivative as the adhesive may be prepared without the use of any alkali in the coating color, thereby making possible a uniform surface pH of the coating, eliminating any possible degradation of the surface fibers of the base stock and resulting in a waste color easy to handle and dispose of.

The following examples are presented in illustration but not in limitation of the invention. All parts and percentages are by weight unless otherwise specified.

Examples 1–27, inclusive

To an aqueous solution of the sodium salt of a water-soluble carboxymethylcellulose was added clay in small portions with vigorous agitation. After the clay was added, the stirring was continued until the color was smooth. Additional water was then added to the color to give the desired amount of solids. The amount of sodium carboxymethylcellulose in the initial solution, the amount of sodium carboxymethylcellulose (based on the clay) in the resulting color and the percent solids of the resulting color are set forth in Table I. This color was applied to handsheets of Litho No. 5 raw stock at a coat weight of 11–13 lb. per ream (24 x 36/500) using a Martinson laboratory coater. After application of the coating to the paper, the coated surface of the sheet was brought into contact with a solution of setting agent. The sheets were passed through squeeze rolls at a nip pressure of 20 lb. per linear inch and were dried on an electric hot plate at 200° F. The number of carboxymethyl groups per anhydroglucose unit, i. e., the degree of substitution of the adhesive, the nature of the setting agent and the properties of the resulting paper are set forth in the following table:

of the coating to the paper, the coated surface of the sheet was brought into contact with a solution of setting

TABLE I.—SODIUM CARBOXYMETHYLCELLULOSE (CMC)

| Example | Degree of Substitution | Percent CMC in Solution | Coating Color | | | Setting Agent | Surface pH | Pick Resistance (Speed Ranger Units) |
|---|---|---|---|---|---|---|---|---|
| | | | Percent CMC (on clay) | Clay+CMC (percent) | Color Viscosity [a] (cps.) | | | |
| 1 | 0.55 | 6 | 7.5 | 45 | 1,943 | none | 5.5–6.0 | <1.0 |
| 2 | 0.55 | 6 | 7.5 | 45 | 1,943 | 25% NaH$_2$PO$_4$ | 5.0–5.5 | 4.5 |
| 3 | 0.55 | 6 | 7.5 | 45 | 1,943 | 20% MgCl$_2$ | 5.0–5.5 | 4.0 |
| 4 | 0.55 | 6 | 7.5 | 45 | 1,943 | 20% CaCl$_2$ | 5.0–5.5 | 1.5 |
| 5 | 0.55 | 7 | 7.5 | 50 | 2,775 | none | 5.5–6.0 | <1.0 |
| 6 | 0.55 | 7 | 7.5 | 50 | 2,775 | 25% NaH$_2$PO$_4$ | 5.5–6.0 | 4.0 |
| 7 | 0.55 | 7 | 7.5 | 50 | 2,775 | 20% MgCl$_2$ | 5.0–5.5 | 3.0 |
| 8 | 0.86 | 6 | 7.5 | 45 | 2,350 | none | 5.0–5.5 | <1.0 |
| 9 | 0.86 | 6 | 7.5 | 45 | 2,350 | 20% NaH$_2$PO$_4$ | 5.0–5.5 | 5.5 |
| 10 | 0.86 | 6 | 7.5 | 45 | 2,350 | 20% MgCl$_2$ [b] | 5.0–5.5 | 6.0 |
| 11 | 0.86 | 6 | 7.5 | 45 | 2,350 | 20% CaCl$_2$ | 5.5–6.0 | 4.0 |
| 12 | 0.86 | 6 | 7.5 | 45 | 2,350 | 20% MgSO$_4$ [b] | 5.0–5.5 | 3.5 |
| 13 | 0.86 | 6 | 7.5 | 45 | 2,350 | 20% Na$_2$SO$_4$ [b] | 5.0–5.5 | 3.0 |
| 14 | 0.86 | 6 | 7.5 | 45 | 2,350 | 20% NaCl [b] | 5.0–5.5 | 3.5 |
| 15 | 0.86 | 7 | 7.5 | 50 | too viscous | none | 4.0–5.0 | <1.0 |
| 16 | 0.86 | 7 | 7.5 | 50 | do | 25% NaH$_2$PO$_4$ [b] | 4.0–5.0 | 6.0 |
| 17 | 0.86 | 7 | 7.5 | 50 | do | 20% MgCl$_2$ [b] | 5.0–5.5 | 5.0 |
| 18 | 0.86 | 7 | 7.5 | 50 | do | 20% CaCl$_2$ | 5.0–5.5 | 2.0 |
| 19 | 0.88 | 7 | 7.5 | 50 | 1,755 | none | 4.0–5.0 | <1.0 |
| 20 | 0.88 | 7 | 7.5 | 50 | 1,755 | 25% NaH$_2$PO$_4$ | 4.0–5.0 | 5.0 |
| 21 | 0.88 | 7 | 7.5 | 50 | 1,755 | 20% MgCl$_2$ [b] | 5.0–5.5 | 4.5 |
| 22 | 0.88 | 7 | 7.5 | 50 | 1,755 | 20% Na$_2$SO$_4$ [b] | 5.0–5.5 | 2.0 |
| 23 | 0.88 | 7 | 7.5 | 50 | 1,755 | 20% NaCl [b] | 5.0–5.5 | 2.5 |
| 24 | 0.88 | 7 | 7.5 | 50 | 1,755 | 20% ZnCl$_2$ [b] | 4.0–5.0 | 3.0 |
| 25 | 0.88 | 7 | 7.5 | 50 | 1,755 | 20% Zn(NO$_3$)$_2$ [b] | 4.0–5.0 | 3.0 |
| 26 | 1.32 | 7 | 7.5 | 50 | 1,535 | none | 4.0–5.0 | <1.0 |
| 27 | 1.32 | 7 | 7.5 | 50 | 1,535 | 20% MgCl$_2$ [b] | 5.0–5.5 | 4.0 |

[a] Hercules Hi-Shear viscometer at 390 sec.$^{-1}$ shear.
[b] Air-dried before setting.

*Examples 28–56, inclusive*

A coating color was prepared as in Examples 1–27, inclusive, using the sodium salt of a water-soluble sulfoethyl cellulose in place of sodium carboxymethylcellulose. This color was applied to handsheets of Litho No. 5 raw stock at a coat weight of 11–13 lb. per ream (24 x 36/500) using a Martinson laboratory coater. After application of the coating to the paper, the coated surface of the sheet was brought into contact with a solution of setting agent. The sheets were passed through squeeze rolls at a nip pressure of 20 lb. per linear inch and were dried on an electric hot plate at 200° F. The number of sulfoethyl groups per anhydroglucose unit, i. e., the degree of substitution of the adhesive, the concentration of sodium sulfoethyl cellulose in the original solution, the nature of the setting agent and the properties of the resulting paper are set forth in the following table:

TABLE II.—SODIUM SULFOETHYL CELLULOSE (SEC)

| Example | Degree of Substitution | Percent SEC in Solution | Coating Color | | | Setting Agent | Surface pH | Pick Resistance (Speed Ranger Units) |
|---|---|---|---|---|---|---|---|---|
| | | | Percent SEC (on clay) | Clay + SEC (percent) | Color Viscosity [a] (cps.) | | | |
| 28 | 0.33 | 7 | 7.5 | 50 | 3,090 | none | 4.0–5.0 | <1.0 |
| 29 | 0.33 | 7 | 7.5 | 50 | 3,090 | 25% NaH$_2$PO$_4$ | 4.0–5.0 | 3.5 |
| 30 | 0.33 | 7 | 7.5 | 50 | 3,090 | 20% MgCl$_2$ | 5.0–5.5 | 3.5 |
| 31 | 0.33 | 7 | 7.5 | 50 | 3,090 | 20% CaCl$_2$ | 5.0–5.5 | 1.5 |
| 32 | 0.36 | 7 | 7.5 | 50 | 2,015 | none | 5.0–5.5 | 1.0 |
| 33 | 0.36 | 7 | 7.5 | 50 | 2,015 | 25% NaH$_2$PO$_4$ | 4.0–5.0 | 3.5 |
| 34 | 0.36 | 7 | 7.5 | 50 | 2,015 | 20% MgCl$_2$ (b) | 5.0–5.5 | 5.0 |
| 35 | 0.36 | 7 | 7.5 | 50 | 2,015 | 20% CaCl$_2$ | 5.0–5.5 | 4.0 |
| 36 | 0.37 | 7 | 7.5 | 50 | 1,460 | none | 4.0–5.0 | <1.0 |
| 37 | 0.37 | 7 | 7.5 | 50 | 1,460 | 25% NaH$_2$PO$_4$ | 4.0–5.0 | 4.0 |
| 38 | 0.37 | 7 | 7.5 | 50 | 1,460 | 20% MgCl$_2$ [b] | 5.0–5.5 | 5.0 |
| 39 | 0.37 | 7 | 7.5 | 50 | 1,460 | 20% CaCl$_2$ [b] | 5.0–5.5 | 3.0 |
| 40 | 0.42 | 7 | 7.5 | 50 | 1,920 | none | 5.0–5.5 | <1.0 |
| 41 | 0.42 | 7 | 7.5 | 50 | 1,920 | 25% NaH$_2$PO$_4$ | 5.0–5.5 | 4.5 |
| 42 | 0.42 | 7 | 5.0 | 50 | 720 | none | 5.0–5.5 | <1.0 |
| 43 | 0.42 | 7 | 5.0 | 50 | 720 | 25% NaH$_2$PO$_4$ | 5.0–5.5 | 2.5 |
| 44 | 0.42 | 7 | 7.5 | 50 | 1,390 | none | 5.0–6.0 | <1.0 |
| 45 | 0.42 | 7 | 7.5 | 50 | 1,390 | 25% NaH$_2$PO$_4$ | 4.0–5.0 | 5.0 |
| 46 | 0.42 | 7 | 7.5 | 50 | 1,390 | 20% MgCl$_2$ [b] | 5.5–6.0 | 4.0 |
| 47 | 0.42 | 7 | 7.5 | 50 | 1,390 | 35% MgCl$_2$ [b] | 5.0–5.5 | 6.0 |
| 48 | 0.42 | 7 | 7.5 | 50 | 1,390 | 20% CaCl$_2$ [b] | 5.0–5.5 | 4.0 |
| 49 | 0.42 | 7 | 7.5 | 50 | 1,390 | 35% CaCl$_2$ [b] | 5.0–5.5 | 7.5 |
| 50 | 0.45 | 7 | 7.5 | 50 | 1,630 | none | 5.5–6.0 | <1.0 |
| 51 | 0.45 | 7 | 7.5 | 50 | 1,630 | 25% NaH$_2$PO$_4$ | 4.0–5.0 | 4.5 |
| 52 | 0.45 | 7 | 5.0 | 50 | 830 | none | 5.0–5.5 | <1.0 |
| 53 | 0.45 | 7 | 5.0 | 50 | 830 | 25% NaH$_2$PO$_4$ | 4.0–5.0 | 2.5 |
| 54 | 0.63 | 7 | 7.5 | 50 | 1,180 | none | 4.0–5.0 | <1.0 |
| 55 | 0.63 | 7 | 7.5 | 50 | 1,180 | 25% NaH$_2$PO$_4$ [b] | 4.0–5.0 | 5.0 |
| 56 | 0.63 | 7 | 7.5 | 50 | 1,180 | 20% CaCl$_2$ [b] | 5.0–5.5 | 2.0 |

[a] Hercules Hi-Shear viscometer at 390 sec.$^{-1}$ shear.
[b] Air-dried before setting.

Examples 57–64, inclusive

A coating color was prepared as in Examples 1–27 only using the sodium salt of a water-soluble carboxymethyl hydroxyethyl cellulose as the adhesive instead of sodium carboxymethylcellulose. This color was applied to handsheets of Litho No. 5 raw stock at a coat weight of 11–13 lb. per ream (24 x 36/500) using a Martinson laboratory coater. After application of the coating to the paper, the coated surface of the sheet was brought into contact with a solution of setting agent. The sheets were passed through squeeze rolls at a nip pressure of 20 lb. per linear inch and were dried on an electric hot plate at 200° F. The number of carboxymethyl and hydroxyethyl groups per anhydroglucose unit, i. e., the degree of substitution of the adhesive, the concentration of sodium carboxymethyl hydroxyethyl cellulose in the original solution, the nature of the setting agent and the properties of the resulting paper are set forth in Table III.

A small amount of NaOH was added to the initial solutions in some of the examples to reduce the viscosity of the colors. The amount of NaOH in the initial solutions and in the colors produced therefrom is shown in the following table:

TABLE III.—SODIUM CARBOXYMETHYL HYDROXYETHYL CELLULOSE (CMHEC)

| Example | Degree of Substitution | | Percent CMHEC in Solution | Percent NaOH in Solution | Coating Color | | | | Setting Agent | Surface pH | Pick Resistance (Speed Ranger Units) |
|---|---|---|---|---|---|---|---|---|---|---|---|
| | Carboxymethyl | Hydroxyethyl | | | Percent CMHEC (on clay) | Clay+ CMHEC (percent) | Percent NaOH | Color Viscosity $^a$ (cps.) | | | |
| 57 | 0.32 | 0.26 | 7 | 0.5 | 7.5 | 50 | 0.23 | 5,070 | none | 6.0–6.5 | 3.0 |
| 58 | 0.32 | 0.26 | 7 | 0.5 | 7.5 | 50 | 0.23 | 5,070 | 25% NaH$_2$PO$_4$ | 4.0–5.0 | 4.5 |
| 59 | 0.32 | 0.26 | 7 | 0.5 | 7.5 | 50 | 0.23 | 5,070 | 20% MgCl$_2$ $^b$ | 5.0–5.5 | 5.5 |
| 60 | 0.32 | 0.26 | 7 | 0.5 | 7.5 | 50 | 0.23 | 5,070 | 20% CaCl$_2$ $^b$ | 5.5–6.0 | 4.0 |
| 61 | 0.43 | 0.41 | 7 | | 7.5 | 50 | | 3,250 | none | 5.0–5.5 | <1.0 |
| 62 | 0.43 | 0.41 | 7 | | 7.5 | 50 | | 3,250 | 25% NaH$_2$PO$_4$ | 4.0–5.0 | 5.5 |
| 63 | 0.43 | 0.41 | 7 | | 7.5 | 50 | | 3,250 | 20% MgCl$_2$ $^b$ | 4.0–5.0 | 4.0 |
| 64 | 0.43 | 0.41 | 7 | | 7.5 | 50 | | 3,250 | 20% CaCl$_2$ $^b$ | 4.0–5.0 | 3.5 |

$^a$ Hercules Hi-Shear viscometer at 390 sec.$^{-1}$ shear.
$^b$ Air-dried before setting.

Examples 65–71, inclusive

A coating color was prepared as in Examples 1–27 and containing 50% solids which consisted of 7.5 parts of sodium cellulose sulfate per 100 parts of clay. This color was applied to handsheets of Litho No. 5 raw stock at a coat weight of 11–13 lb. per ream (24 x 36/500) using a Martinson laboratory coater. After application of the coating to the paper, the coated surface of the sheet was brought into contact with a solution or vapor of setting agent. The sheets which had been dipped in the setting solution were passed through squeeze rolls at a nip pressure of 20 lb. per linear inch and were dried on an electric hot plate at 200° F. The number of sulfate groups per anhydroglucose unit, i. e., the degree of substitution of the adhesive, the concentration of sodium cellulose sulfate in the original solution, the nature of the setting agent and the properties of the resulting paper are set forth in the following table:

TABLE IV.—SODIUM CELLULOSE SULFATE (SCS)

| Example | Degree of Substitution | Percent SCS in Solution | Coating Color | | | Setting Agent | Surface pH | Pick Resistance (Speed Ranger Units) |
|---|---|---|---|---|---|---|---|---|
| | | | Percent SCS (on clay) | Clay+ SCS (percent) | Color Viscosity $^a$ (cps.) | | | |
| 65 | 0.33 | 7 | 7.5 | 50 | 2,470 | none | 5.0–5.5 | 2.0 |
| 66 | 0.33 | 7 | 7.5 | 50 | 2,780 | 20% MgCl$_2$ $^b$ | 5.0–5.5 | 5.5 |
| 67 | 0.33 | 7 | 7.5 | 50 | 2,470 | 20% MgCl$_2$ | 5.5–6.0 | 6.0 |
| 68 | 0.33 | 7 | 7.5 | 50 | 2,470 | 25% NaH$_2$PO$_4$ | 4.5–5.0 | 5.5 |
| 69 | 0.33 | 7 | 7.5 | 50 | 2,470 | 20% CaCl$_2$ $^b$ | 5.5–6.0 | 5.0 |
| 70 | 0.33 | 10 | 7.5 | 50 | 2,150 | 20% NaCl | 5.0–5.5 | 4.5 |
| 71 | 0.33 | 10 | 7.5 | 50 | 3,160 | NH$_3$ vapor $^c$ | 4.0–5.0 | 4.0 |

$^a$ Hercules Hi-Shear viscometer at 390 sec.$^{-1}$ shear.
$^b$ Air-dried before setting.
$^c$ Sheets exposed to vapor from boiling concentrated NH$_4$OH for 10 to 15 min.

Examples 72–80, inclusive

A coating color was prepared as in Examples 1–27, inclusive, using a water-soluble hydroxyethyl cellulose as the coating adhesive instead of the sodium salt of a water-soluble carboxymethylcellulose. The concentration of hydroxyethyl cellulose in the initial solution used to prepare the colors together with the total solids of the resulting colors are shown in Table V. The color so prepared was applied to handsheets of Litho No. 5 raw stock at a coat weight of 11–13 lb. per ream (24 x 36/500) using a Martinson laboratory coater. After application of the coating to the paper, the coated surface of the sheet was brought into contact with a solution of setting agent. The sheets were passed through squeeze rolls at a nip pressure of 20 lb. per linear inch and were dried on an electric hot plate at 200° F. The number of hydroxyethyl cellulose groups per anhydroglucose unit, i. e., the degree of substitution of the adhesive, the concentration of hydroxyethyl cellulose in the original solution, the nature of the setting agent and the properties of the resulting paper are set forth in Table V.

A small amount of NaOH was added to the initial solutions in some of the examples to reduce the viscosity of the colors. The amount of NaOH in the initial solutions and in the colors produced therefrom is shown in the following table:

TABLE V.—HYDROXYETHYL CELLULOSE (HEC)

| Example | Degree of Substitution | Percent HEC in Solution | Percent NaOH in Solution | Coating Color | | | | Setting Agent | Surface pH | Pick Resistance (Speed Ranger Units) |
|---|---|---|---|---|---|---|---|---|---|---|
| | | | | Percent HEC (on clay) | Clay+HEC (percent) | Percent NaOH | Color Viscosity [a] (cps.) | | | |
| 72 | 1.14 | 8 | 1 | 7.5 | 50 | 0.4 | 1,755 | none | 6.5–7.0 | 1.0 |
| 73 | 1.14 | 8 | 1 | 7.5 | 50 | 0.4 | 1,755 | 20% $CaCl_2$ [b] | 6.0 | 3.0 |
| 74 | 1.14 | 8 | 1 | 7.5 | 50 | 0.4 | 1,755 | 20% $MgSO_4$ [b] | 6.0–6.5 | 2.0 |
| 75 | 1.14 | 8 | 1 | 7.5 | 50 | 0.4 | 1,755 | 20% $Al_2(SO_4)_3$ | 5.0–5.5 | 2.0 |
| 76 | 1.14 | 8 | 1 | 7.5 | 50 | 0.4 | 1,755 | 20% NaCl | 6.0–6.5 | 2.0 |
| 77 | 1.67 | 10 | 0 | 7.5 | 50 | 0 | 2,340 | none | 5.0–5.5 | 1.0 |
| 78 | 1.67 | 10 | 0 | 7.5 | 50 | 0 | 2,340 | 25% $NaH_2PO_4$ | 5.0–5.5 | 3.0 |
| 79 | 1.67 | 10 | 0 | 7.5 | 50 | 0 | 2,340 | 20% $CaCl_2$ [b] | 5.0–5.5 | 3.5 |
| 80 | 1.67 | 10 | 0 | 7.5 | 50 | 0 | 2,340 | 20% $Al_2(SO_4)_3$ | 5.0–5.5 | 2.5 |

[a] Hercules Hi-Shear viscometer at 390 sec.$^{-1}$ shear.
[b] Air-dried before setting.

The pick resistance referred to in the examples was obtained by means of a Hercules print tester using the method described in "The Hercules Print Tester" by E. J. Barber and J. W. Davis in Tappi, vol. 34, page 433 (October 1951). The higher the speed ranger number the greater is the pick resistance or the bonding strength of the adhesive.

Any gellable water-soluble cellulose derivative may be used as the binder in preparing the coated papers according to the process of the instant invention. By "water-soluble" is meant that the cellulose derivative at a 5% by weight concentration is completely dispersible in water. A small amount of alkali, i. e., less than about 1% by weight based on the total weight of the coating color, may be added if higher concentrations of binder or lower viscosities in the resulting coating color are desired.

Cellulose itself is not water-soluble despite the large number of hydroxyl groups contained in the molecule. This is due to the fact that the cellulose chains fit so well against one another that linking of adjoining chains by hydrogen bonding occurs. Moreover, the cellulose molecule is rigid enough to prevent a relatively short segment from lifting off without disturbing the neighboring portion of the chain. Water does not form a stable enough complex with the hydroxyl groups to destroy the hydrogen bonding. The insertion of substituent groups into the cellulose chain pushes apart the cellulose molecules, rendering the hydroxyl radicals available for hydration. To get smooth solutions, enough substituent groups have to be introduced throughout the whole molecule to insure complete separation of the less substituted portions of the chains by water. If too many substituent groups are introduced, however, the number of hydroxyl groups available for hydration is greatly reduced, and unless the substituent group itself is capable of hydration, the product is incompletely soluble or only swelled by water. If the substituent group enters the cellulose molecule in a uniform manner along the cellulose chain, it will be more effective in separating the cellulose molecules than if it were to be randomly distributed along the chain. Thus, water solubility can be obtained at lower degrees of substitution when a fairly uniform distribution of substituent radicals is obtained. The manner of substitution, i. e., the degree of randomness, is determined by the method of manufacturing the substituted cellulose. Thus, the water solubility of cellulose is determined by the nature of the substituent group, the method of manufacture and the degree of substitution, i. e., the average number of substituent groups per anhydroglucose unit. Examples of water-soluble cellulose derivatives are the alkyl ethers, such as ethyl cellulose; hydroxyalkyl ethers, such as hydroxyethyl cellulose; sulfoalkyl ethers, such as sulfoethyl cellulose; carboxyalkyl ethers, such as carboxymethylcellulose; carboxyalkyl hydroxyalkyl ethers, such as carboxymethyl hydroxyethyl cellulose; cellulose sulfate and cellulose half-esters of dibasic organic acids, such as cellulose phthalate, cellulose succinate, etc. Those cellulose derivatives which may have free acid groups, such as cellulose sulfate, sulfoalkyl cellulose, carboxyalkyl cellulose, carboxyalkyl hydroxyalkyl cellulose, and cellulose half-esters of dibasic organic acids, are used in the form of their water-soluble salts, such as their sodium, potassium, ammonium, etc., salts. By the terms "cellulose sulfate," "sulfoalkyl cellulose," "carboxyalkyl cellulose," "carboxyalkyl hydroxyalkyl cellulose," "cellulose phthalate," "cellulose succinate," etc., as used throughout the specification and claims, is meant the salts of the particular cellulose derivative which possess the requisite solubility characteristics specified above. Examples of operable ranges of substitution in terms of the average number of substituent groups per anhydroglucose unit for particular cellulose derivatives are: hydroxyethyl cellulose, about 1.1 to about 1.7; sodium carboxymethylcellulose, about 0.5 to about 1.3; sodium sulfoethyl cellulose, about 0.3 to about 0.6; sodium cellulose sulfate, about 0.2 to about 1.5; and sodium carboxymethyl hydroxyethyl cellulose, about 0.3 to about 0.7 carboxymethyl groups and about 0.2 to about 0.6 hydroxyethyl groups. It is understood, however, that the limitation of substitution for any particular cellulose derivative will vary somewhat with the method of manufacture of the cellulose derivatives. The operable upper limit of substitution for any particular cellulose derivative will vary with the method of manufacture of the cellulose derivative, with the nature of the setting agent employed, and with the concentration of setting agent used. The preparation of gellable water-soluble cellulose derivatives will be within the knowledge of those skilled in the art, and it is to be understood that the binder contemplated herein includes any or all of these derivatives.

The pigment material which is utilized in the coating color comprises one of the paper coating fillers such as, for example, a pulverized clay or the like. For higher quality or special types of paper, there may be substituted therefor other known pigment materials such as, for example, titanium dioxide, satin white or other coating pigments alone or preferably with a clay base. The modification of the coating color using these materials will be within the knowledge of those skilled in the art, and it is to be understood that the pigment material contemplated herein includes any or all of these materials.

The amount of binder in the coating color is maintained between 3% and about 15% based on the weight of the pigment and preferably between 6% and 8%. In general, the binder content will depend upon the grade and the end use of the paper being prepared.

For optimum results in the coating of paper it is preferred to prepare a coating color having a total solids composition which is relatively high, thus providing good surface coating quality and economic operation. A preferred range of total solids for the coating color is between about 30% and 65% solids with an optimum value at about 40% to 55%.

Any setting agent for the particular water-soluble cellulose derivative employed may be used in accordance with this invention. The ability of the setting agent to coagulate the cellulose derivative is directly dependent upon the fundamental nature of its constituent ions and in particular upon its affinity for water molecules. The ions of the setting agent are thought to compete with the particles of the cellulose derivative for the available water. The highly polar ions attract the dipolar water molecules more strongly than do the relatively nonpolar cellulose derivative particles, thereby dehydrating the cellulose derivative causing it to coagulate. The efficacy of an ion in coagulating the cellulose derivative is therefore attributed to its tendency to become hydrated. Among the setting agents which may be used to coagulate the water-soluble cellulose derivatives are the following: the water-soluble halides and nitrates of the alkali metals, the alkaline earth metals, magnesium and zinc; the mono- and di-alkali metal phosphates, etc. The following have also been used as setting agents: the sulfates of the alkali metals and of aluminum, magnesium and zinc; ammonia vapor; ammonium chloride, ammonium sulfate, etc. The efficacy of a particular setting agent varies somewhat with the nature of the cellulose derivative. In general, the preferred setting agents are mono- and di-sodium phosphate, magnesium chloride, calcium chloride, zinc nitrate and sodium chloride.

The setting agent is applied to the paper in the form of an aqueous solution preferably of about 10% to about 30% concentration, except when ammonia vapor is used. Although the concentration of the solution is not critical, it must be high enough to coagulate the cellulose derivative. In case the reverse coating process is used, it may be desired to incorporate a wetting agent in the aqueous solution to facilitate impregnation of the base stock.

Any suitable coating machine known to those skilled in the art may be used. Thus, the machine may be a shaft coater, a roll coater, a knife coater, an air brush coater, a gravure or letter press-type, etc.

The setting agent may be heated to 150° to 200° F. to speed up the reaction, but this step is not necessary.

The coated paper may be dried by any suitable means, but it is preferred to dry the paper in contact with a drum drier or a series of paper machine drier rolls. This drying under tension minimizes cockle from shrinkage. In the case of cellulose derivatives which are very highly water-soluble, it is desirable to subject the coated paper to a preliminary drying before contacting the coated paper with the setting agent. This preliminary drying prevents the coating from being squeezed off by the roller and the subsequent treatment with the setting agent coagulates the binder to give a coating of improved bonding strength.

Papers prepared according to the process of this invention have good printing properties and give glossy prints which dry rapidly. The coatings laid down according to this process have an exceptionally high pick resistance, evidencing exceptionally good bonding between the coating and the paper base.

What I claim and desire to protect by Letters Patent is:

1. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating color consisting essentially of a pigment dispersed in an aqueous solution of a gellable water-soluble sodium sulfoethyl cellulose as the binder, said coating color having from about 30% to about 65% total solids and having said binder present in the amount of between about 5% and about 15% based on the weight of the pigment, and after application of said coating color coagulating said water-soluble sodium sulfoethyl cellulose by contacting said coating color with a water solution of a setting agent selected from the group consisting of the mono- and di-alkali metal phosphates and the water-soluble halides and nitrates of the alkali metals, the alkaline earth metals, magnesium, and zinc, squeezing off the excess solution, and then drying the paper.

2. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating color consisting essentially of a pigment dispersed in an aqueous solution of a gellable water-soluble sodium carboxymethylcellulose as the binder, said coating color having from about 30% to about 65% total solids and having said binder present in the amount of between about 5% and about 15% based on the weight of the pigment, and after application of said coating color coagulating said water-soluble sodium carboxymethylcellulose by contacting said coating color with a water solution of a setting agent selected from the group consisting of the mono- and di-alkali metal phosphates and the water-soluble halides and nitrates of the alkali metals, the alkaline earth metals, magnesium, and zinc, squeezing off the excess solution, and then drying the paper.

3. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating color consisting essentially of a pigment dispersed in an aqueous solution of a gellable water-soluble sodium carboxymethyl hydroxyethyl cellulose as the binder, said coating color having from about 30% to about 65% total solids and having said binder present in the amount of between about 5% and about 15% based on the weight of the pigment, and after application of said coating color coagulating said water-soluble sodium carboxymethyl hydroxyethyl cellulose by contacting said coating color with a water solution of a setting agent selected from the group consisting of the mono- and di-alkali metal phosphates and the water-soluble halides and nitrates of the alkali metals, the alkaline earth metals, magnesium, and zinc, squeezing off the excess solution, and then drying the paper.

4. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating color consisting essentially of a pigment dispersed in an aqueous solution of a gellable water-soluble hydroxyethyl cellulose as the binder, said coating color having from about 30% to about 65% total solids and having said binder present in the amount of between about 5% and about 15% based on the weight of the pigment, and after application of said coating color coagulating said water-soluble hydroxyethyl cellulose by contacting said coating color with a water solution of a setting agent selected from the group consisting of the mono- and di-alkali metal phosphates and the water-soluble halides and nitrates of the alkali metals, the alkaline earth metals, magnesium, and zinc, squeezing off the excess solution, and then drying the paper.

5. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating color consisting essentially of a pigment dispersed in an aqueous solution of a gellable water-soluble cellulose derivative as the binder, said coating color having from about 30% to about 65% total solids and having said binder present in the amount of between about 5% and about 15% based on the weight of the pigment, and after application of said coating color coagulating said water-soluble cellulose derivative by contacting said coating color with a water solution of an alkali metal acid phosphate, squeezing off the excess solution, and then drying the paper.

6. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulose fibers a coating consisting essentially of a pigment dispersed in an aqueous solution of a gellable water-soluble cellulose derivative as the binder, said coating color having from about 30% to about 65% total solids and having said binder present in the amount of between about 5% and about 15% based on the weight of the pigment, and after application of said coating coagulating said water-soluble cellulose derivative by contacting said coating with a water solution of an alkaline earth metal halide, squeezing off the excess solution, and then drying the paper.

7. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating consisting essentially of a pigment dispersed in an aqueous solution of a gellable water-soluble cellulose derivative as the binder, said coating color having from about 30% to about 65% total solids and having said binder present in the amount of between about 5% and about 15% based on the weight of the pigment, and after application of said coating coagulating said water-soluble cellulose derivative by contacting said coating with a water solution of an alkaline earth metal nitrate, squeezing off the excess solution, and then drying the paper.

8. The process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating color consisting essentially of a pigment dispersed in an aqueous solution of a gellable water-soluble cellulose derivative as the binder, said coating color having from about 50% to about 65% total solids and having said binder present in the form of between about 5% and about 15% based on the weight of the pigment, and after application of said coating color coagulating said water-soluble cellulose derivative by contacting said coating color with a water solution of an alkali metal halide, squeezing off the excess solution and then drying the paper.

9. In the process for preparing a coated paper of the type having a base of cellulosic fibers and a printing surface consisting essentially of a film of contiguous pigment particles interspersed in binder by means of which the pigment is retained on the base comprising applying to the surface of a web of cellulosic fibers a coating color consisting essentially of a pigment dispersed in aqueous solution of a gellable, water-soluble cellulose derivative as the binder, said coating color having from about 30% to about 65% total solids and having said binder present in the amount of between about 5% and about 15% based on the weight of the pigment, and drying the paper, the improvement which comprises coagulating said water-soluble cellulose derivative before drying the paper by contacting said coating color with a setting agent selected from the group consisting of the mono- and di-alkali metal phosphates and the water-soluble halides and nitrates of the alkali metals, the alkaline earth metals, magnesium, and zinc.

10. The process for preparing a coated paper of the type having a base of cellulosic fibers and a printing surface consisting essentially of a film of contiguous pigment particles interspersed in binder by means of which the pigment is retained on the base, comprising applying to the surface of a web of cellulosic fibers a coating color consisting essentially of a pigment dispersed in an aqueous solution of a gellable water-soluble cellulose derivative as the binder, said coating color having from about 30% to about 65% total solids and having said binder present in the amount of between about 5% and about 15% based on the weight of the pigment, and after application of said coating color coagulating said water-soluble cellulose derivative by contacting said coating color with a water solution of a setting agent selected from the group consisting of the mono- and di-alkali metal phosphates and the water-soluble halides and nitrates of the alkali metals, the alkaline earth metals, magnesium, and zinc, squeezing off the excess solution, and then drying the paper.

References Cited in the file of this patent

UNITED STATES PATENTS

| | | |
|---|---|---|
| 2,235,798 | Collings | Mar. 18, 1941 |
| 2,297,698 | Freeman | Oct. 6, 1942 |
| 2,370,517 | Bass | Feb. 27, 1945 |
| 2,502,783 | Erickson | Apr. 4, 1950 |
| 2,635,972 | Azorlosa | Apr. 21, 1953 |
| 2,640,790 | Barber | June 2, 1953 |
| 2,655,864 | Newman | Oct. 20, 1953 |

FOREIGN PATENTS

| | | |
|---|---|---|
| 856,012 | France | May 25, 1940 |